W. WHALEY.
LOADING MACHINE.
APPLICATION FILED NOV. 26, 1917.

1,379,427.

Patented May 24, 1921.
13 SHEETS—SHEET 1.

Inventor
William Whaley
By Cyrus Kehr
Attorney

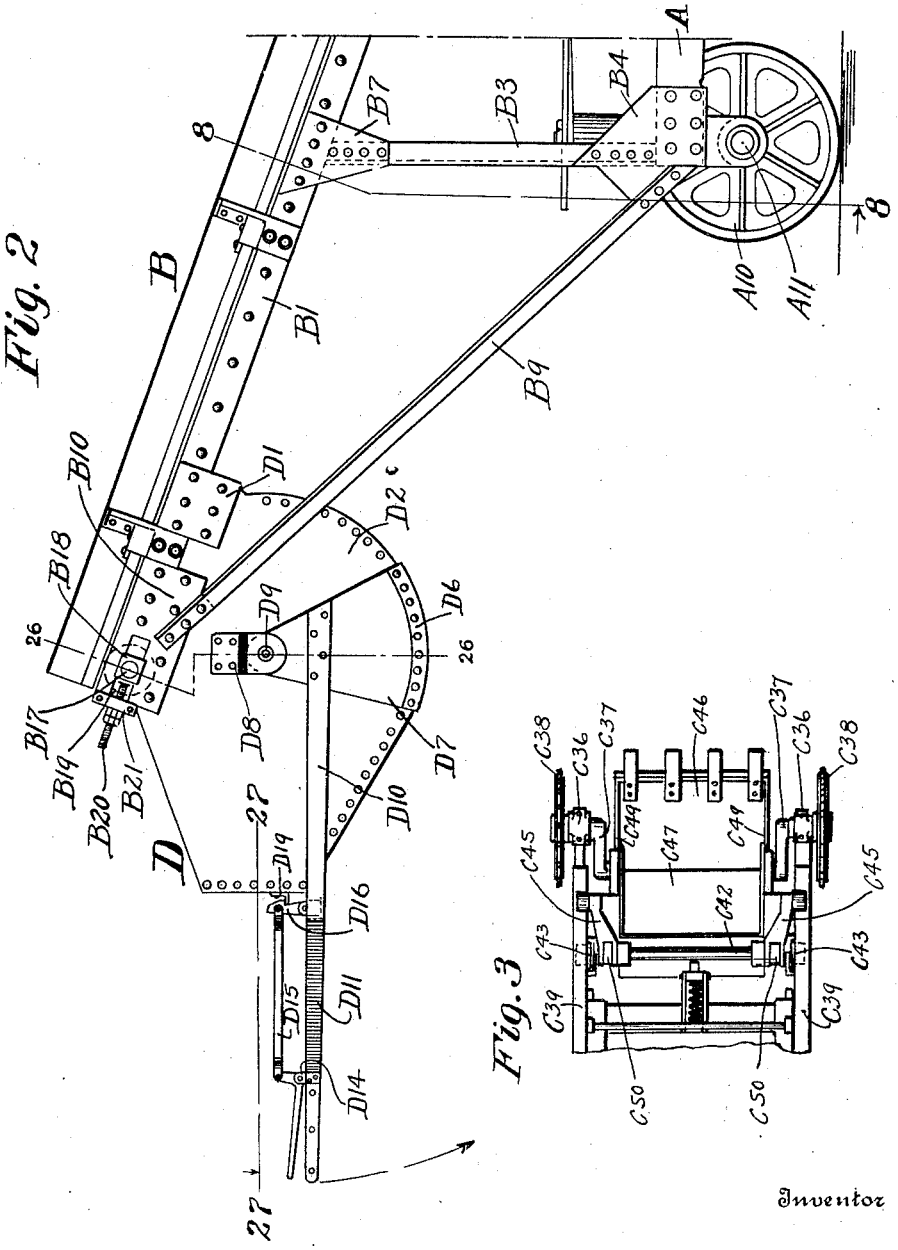

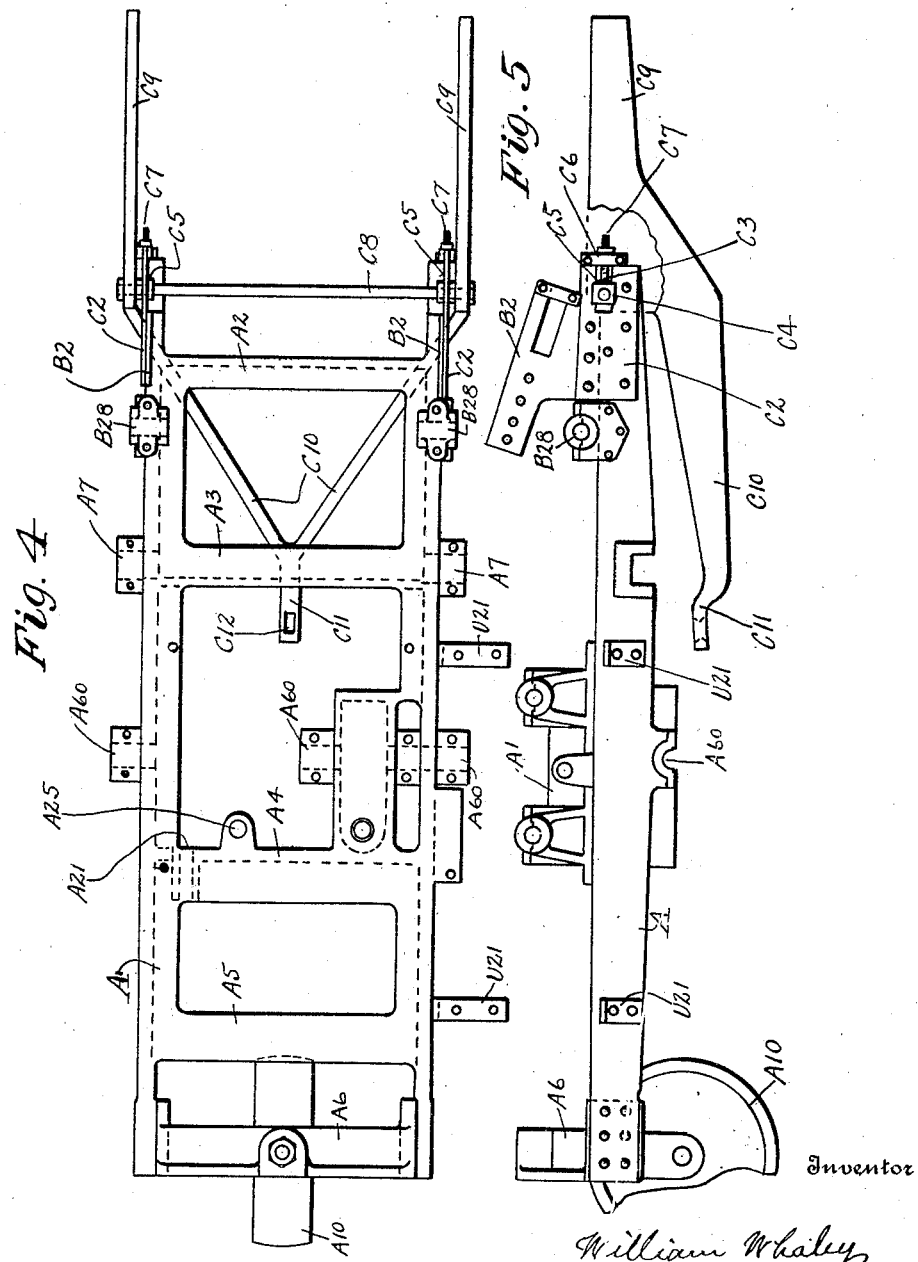

W. WHALEY.
LOADING MACHINE.
APPLICATION FILED NOV. 26, 1917.

1,379,427.

Patented May 24, 1921.
13 SHEETS—SHEET 6.

Inventor
William Whaley
Cyrus Kehr
By
Attorney

W. WHALEY.
LOADING MACHINE.
APPLICATION FILED NOV. 26, 1917.
1,379,427.
Patented May 24, 1921.
13 SHEETS—SHEET 7.
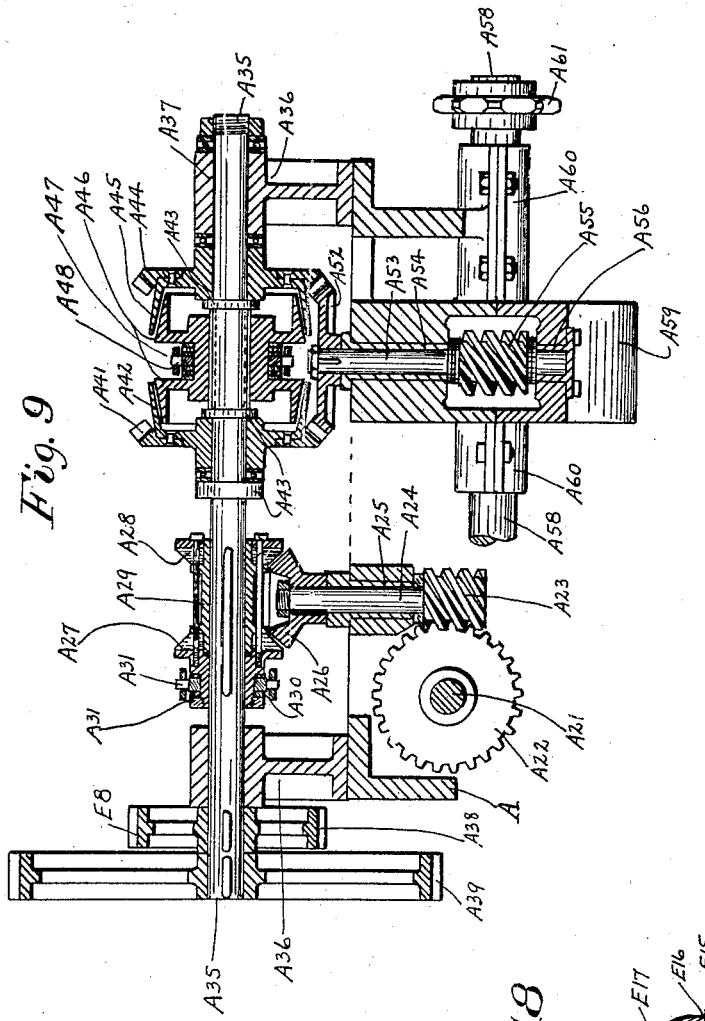
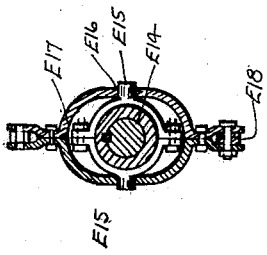
Inventor
William Whaley
By Cyrus Kehr
Attorney W. WHALEY.
LOADING MACHINE.
APPLICATION FILED NOV. 26, 1917.
1,379,427.
Patented May 24, 1921.
13 SHEETS—SHEET 8.
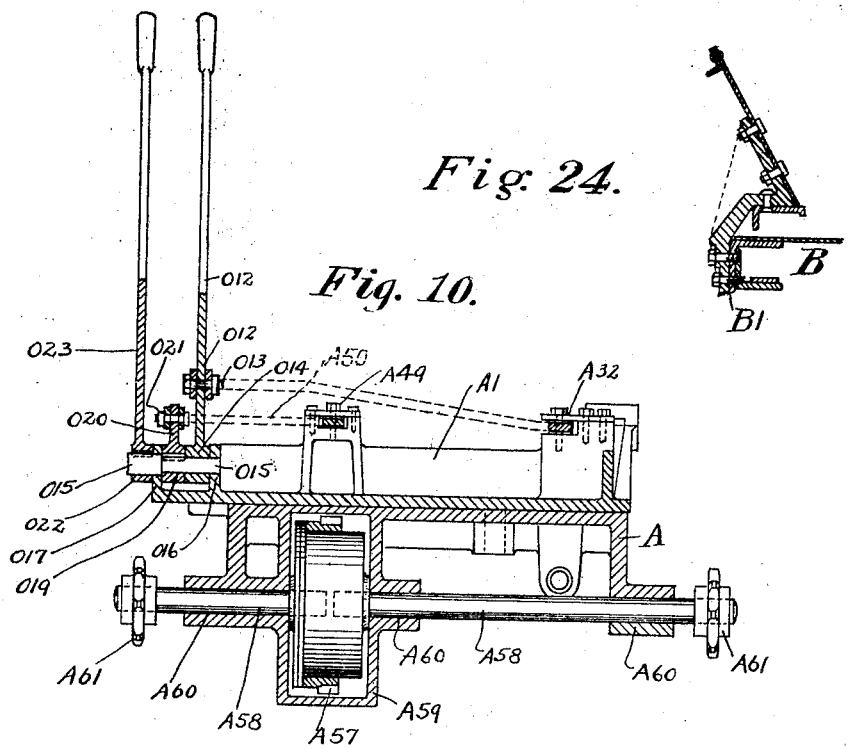
Fig. 24.
Fig. 10.
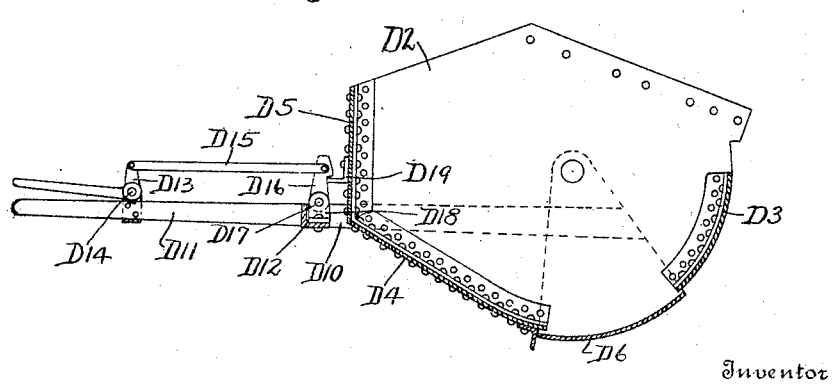
Fig. 28
Inventor
William Whaley
By Cyrus Kehr
Attorney

W. WHALEY.
LOADING MACHINE.
APPLICATION FILED NOV. 26, 1917.

1,379,427.

Patented May 24, 1921.
13 SHEETS—SHEET 9.

Inventor
William Whaley
By Cyrus Kehr
Attorney

W. WHALEY.
LOADING MACHINE.
APPLICATION FILED NOV. 26, 1917.

1,379,427.

Patented May 24, 1921.
13 SHEETS—SHEET 10.

Inventor
William Whaley
By Cyrus Kehr
Attorney

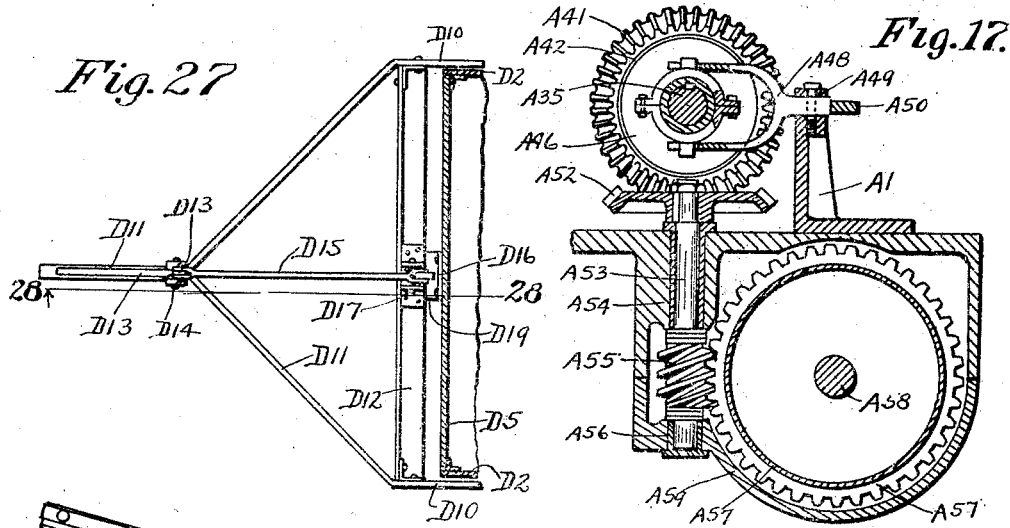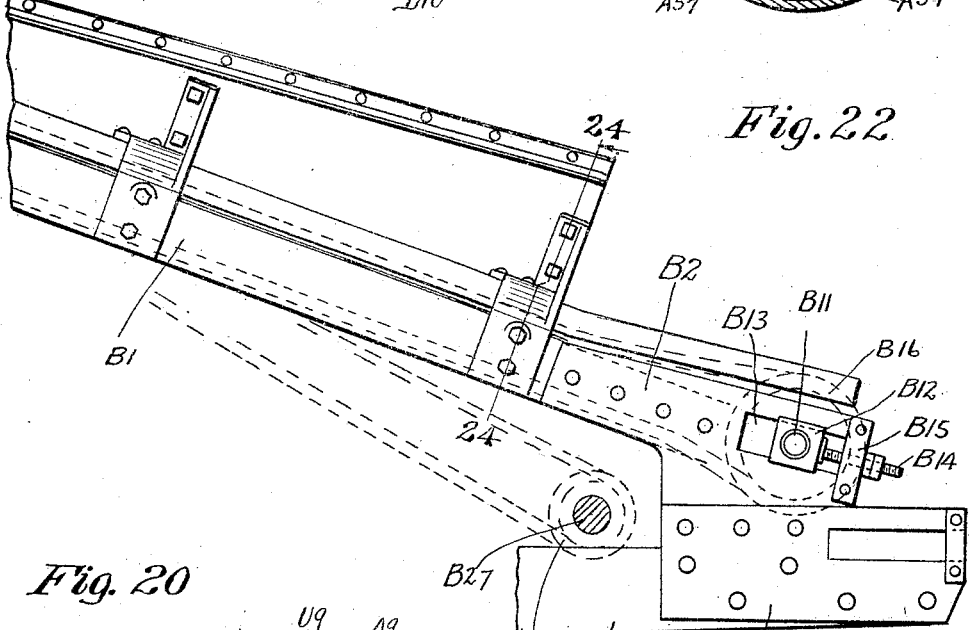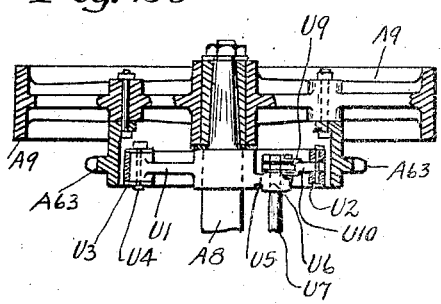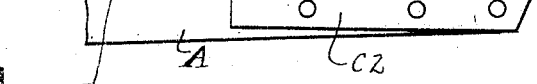

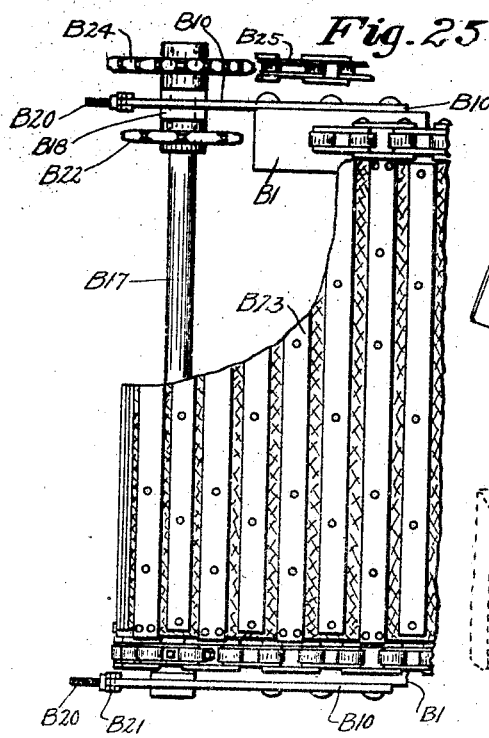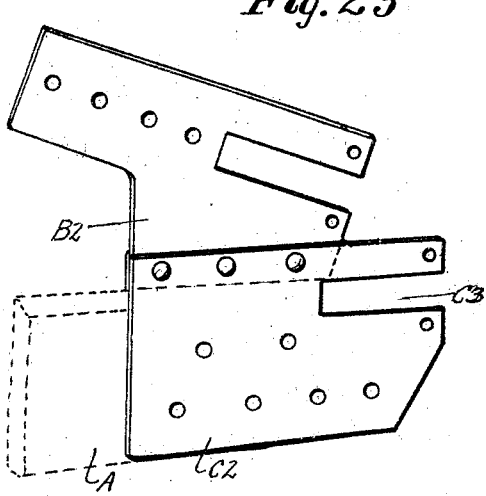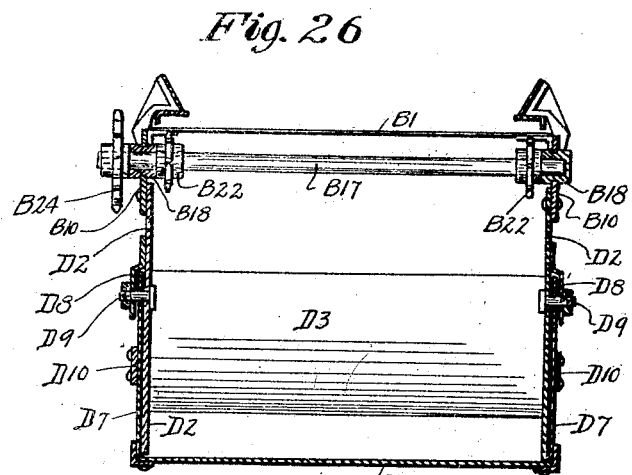

UNITED STATES PATENT OFFICE.

WILLIAM WHALEY, OF KNOXVILLE, TENNESSEE.

LOADING-MACHINE.

1,379,427.　　　　Specification of Letters Patent.　　Patented May 24, 1921.

Application filed November 26, 1917. Serial No. 204,032.

*To all whom it may concern:*

Be it known that I, WILLIAM WHALEY, a citizen of the United States, residing at Knoxville, in the county of Knox and State of Tennessee, have invented a new and useful Improvement in Loading-Machines, of which the following is a specification, reference being had to the accompanying drawing.

My improvement relates to loading machines which are adapted to move to masses of material to be loaded and take quantities of such material and carry said material rearward across the machine and discharge the material from the rear part of the machine.

The machine comprises supporting wheels on which it is adapted to be driven forward and backward and to be steered obliquely sidewise while being driven forward or backward. The machine further comprises a conveying mechanism extending from the front of the machine rearward beyond the main frame and upward to a sufficient height to make space below the rear end of said conveying mechanism to place a vehicle or receptacle into which the material carried by the conveyer is to be discharged. In the preferred form, the machine further comprises a magazine or receptacle applied at the rear of the conveying mechanism to receive the material discharged from the conveying mechanism, the said receptacle being at such height as to permit bringing a vehicle or other portable receptacle or carrying means below the first-mentioned receptacle, in order that the magazine receptacle may uninterruptedly receive material from the elevating mechanism and vehicles may periodically be placed below the magazine receptacle and the material discharged from the magazine receptacle into the carrying vehicle. The machine further comprises mechanism located at the front of the elevator mechanism and adapted to take material located at the front of the machine.

One of the objects of the invention is to provide in convenient and efficient form a loading machine comprising conveying mechanism extending rearward and upward over the machine and magazine means for receiving the material discharged from the rear end of the conveying mechanism, in order that the material carried by the conveying mechanism may be accumulated and periodically discharged into carrying receptacles.

Another object of the invention is to associate with the main frame and conveying mechanism of a loading machine carrying and steering wheels and propelling mechanism of efficient and convenient form, in order that the position of the machine may readily be changed as may be desirable or necessary while performing the work of loading.

In the accompanying drawings,

Fig. 2 is a right hand elevation of the rear half of the machine of which the forward half is shown in Fig. 1;

Fig. 3 is a plan of the shovel mechanism shown in elevation in Fig. 1;

Fig. 4 is a plan of the main frame or body of the machine with a supplemental frame and the rear carrying wheel applied thereto;

Fig. 5 is a right hand elevation of the structure shown in Figs. 1 and 2 with the chair casting in position on the main frame;

Fig. 9 is an upright section on the line 9—9, of Figs. 1 and 7, looking toward the right, the conveyer being omitted;

Fig. 10 is an upright section on the line, 10—10, of Fig. 1 and Fig. 7, looking toward the left;

Fig. 17 is an upright section on the line, 17—17, at the middle of Fig. 7, looking in the direction of the arrow;

Fig. 18 is an upright section on the line, 18—18 of Fig. 11 looking toward the right;

Fig. 20 is a horizontal section on the line, 20—20, of Fig. 19;

Fig. 22 is a right hand side elevation of the lower end of the conveyer;

Fig. 23 is a detail view of the plates by which the lower or forward end of the conveyer is secured to the main frame;

Fig. 24 is a section on the line, 24—24, of Fig. 22, looking toward the left;

Fig. 25 is a detail plan of the upper end of the conveyer, portions being broken away;

Fig. 26 is an upright section on the line, 26—26, of Fig. 2, looking toward the right;

Fig. 27 is a horizontal section on the line, 27—27, of Fig. 2;

Fig. 28 is an upright section on the line 28—28, of Fig. 27, looking in the direction of the arrow.

Referring to said drawings, A is a frame or base upon which the working members of the machine are supported. Said frame comprises cross members, $A^2$, $A^3$, $A^4$, and $A^5$. At the rear end of said frame is a bridge-piece, $A^6$, extending from one side of the frame to the other. In line with the cross member, $A^3$, the frame has two bearings, $A^7$, which are on a line which is horizontal and transverse to the main frame at about the height of the lower face of the frame. Said bearings receive the main axle, $A^8$, which projects laterally beyond each side edge of the frame far enough to receive a main carrying wheel, $A^9$.

Near the middle of the main frame are bearings, $A^{60}$, which are on a common axial line which is horizontal and transverse to the length of the machine. Said bearings are on the lower face of the frame and receive the shaft, $A^{58}$, to be hereinafter described.

Figure 6:
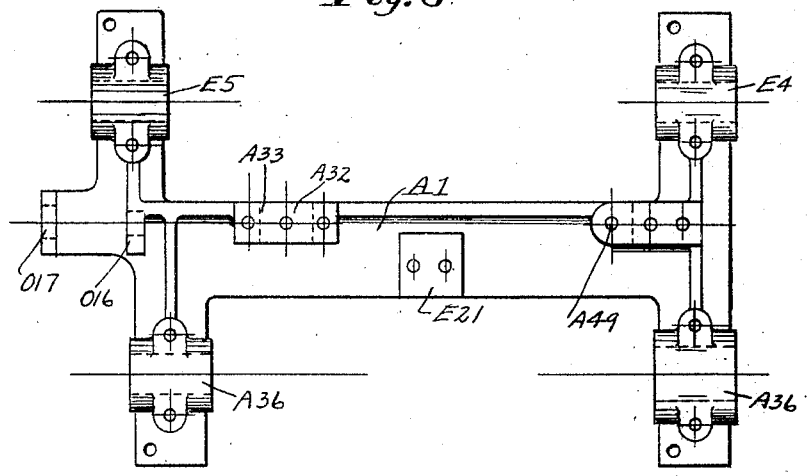
Fig. 6 is a plan of the chair casting.
Figure 11:
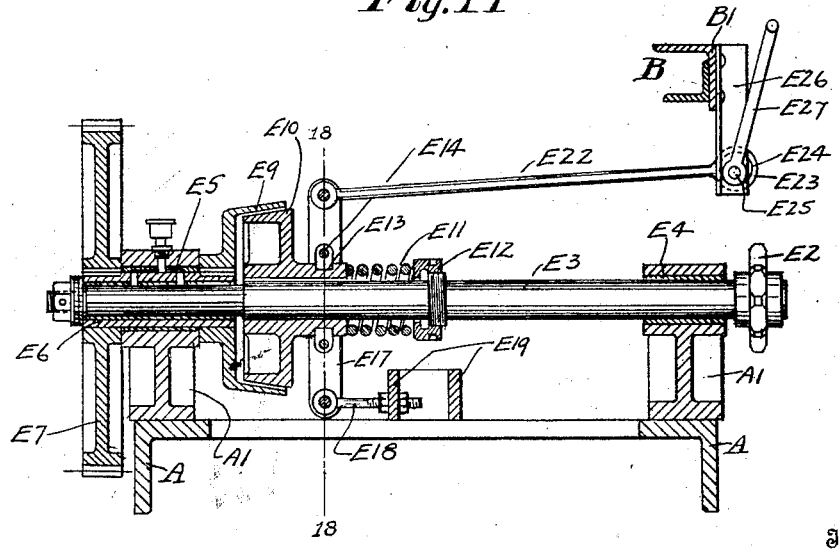
Fig. 11 is an upright section on the line, 11—11, of Fig. 1 and Fig. 7.
Figure 7:
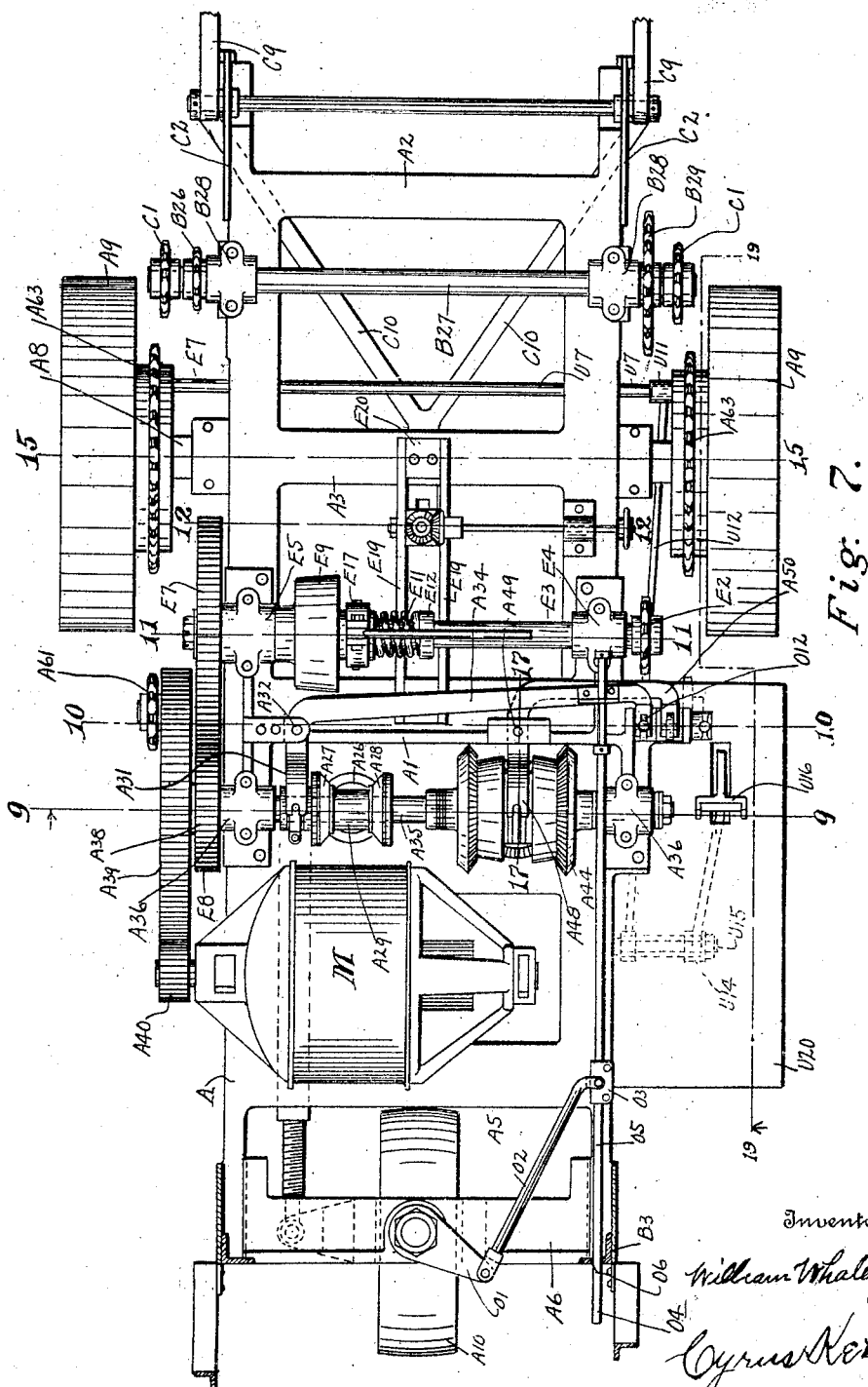
Fig. 7 is a plan of the machine, the conveyer, the operator's seat, and the forward portion of the machine being omitted.
Figure 8:
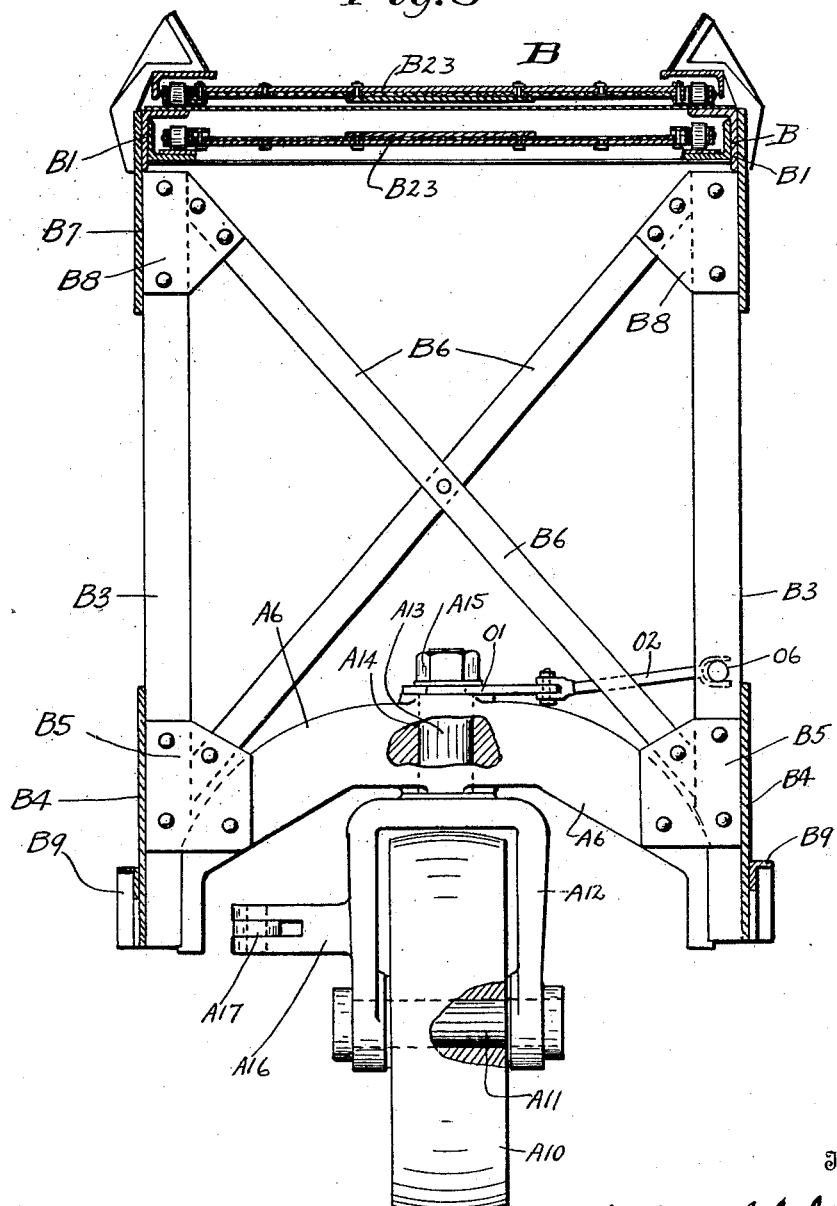
Fig. 8 is an upright section on the line, 8—8, of Fig. 2, looking toward the right.
Figure 14:
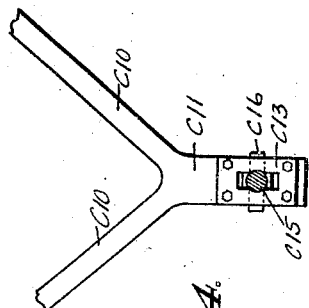
Fig. 14 is a horizontal section on the line, 14—14, of Fig. 12 and Fig. 13.
Figure 13:
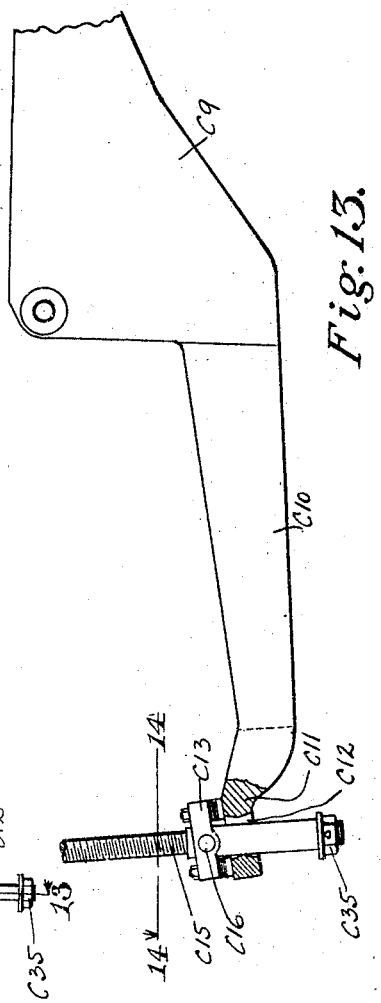
Fig. 13 is an upright section on the line, 13—13, of Fig. 12.
Figure 12:
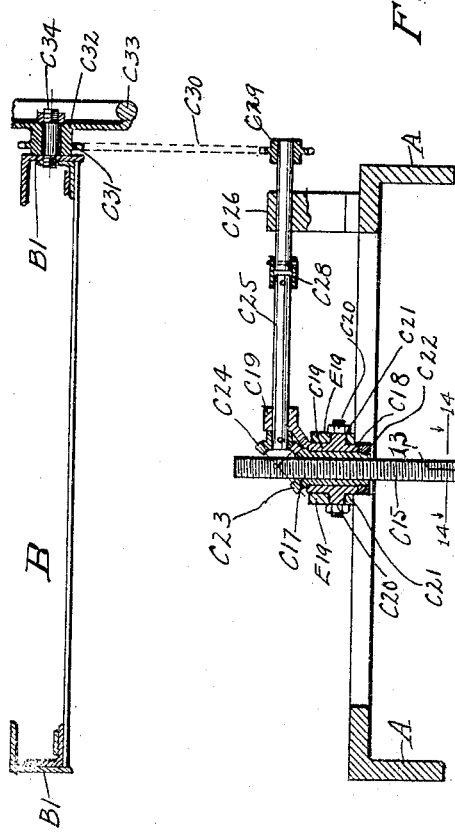
Fig. 12 is an upright section on the line, 12—12, of Fig. 7, looking toward the right.
Figure 15:
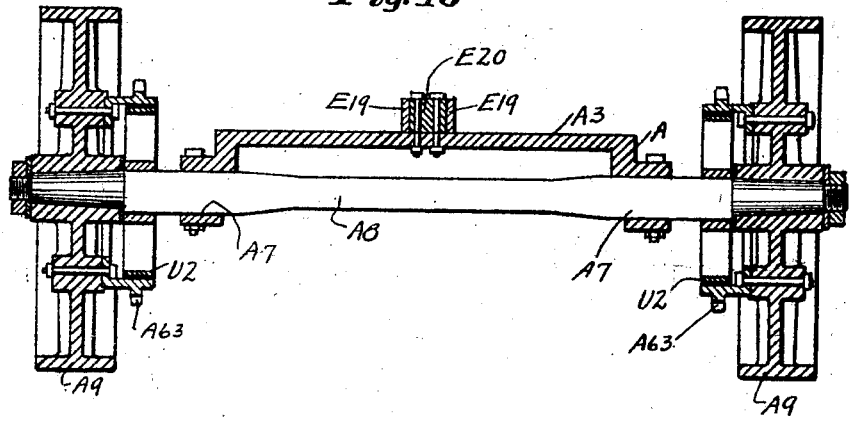
Fig. 15 is an upright sectional view on the line, 15—15, of Fig. 1 and Fig. 7, looking toward the left.

The chair casting, $A^1$ (shown separately in Fig. 6 and shown in elevation on Fig. 5) is seated on the main frame above the bearings, $A^{60}$, and has bearings as will be hereinafter described.

Figure 16:
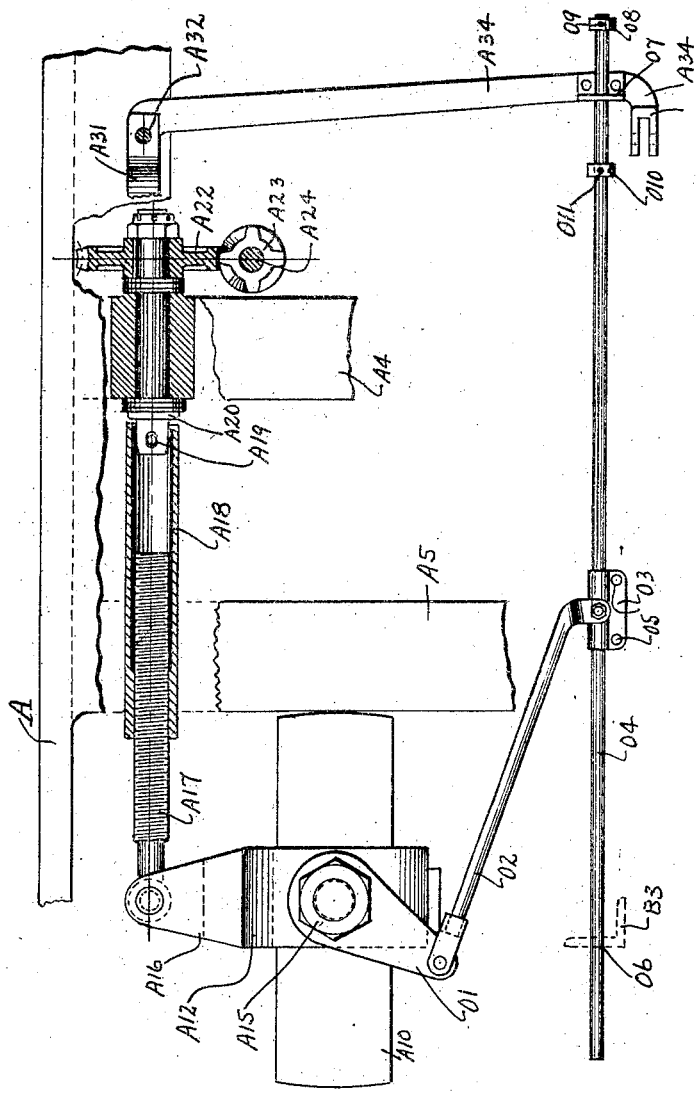
Fig. 16 is a detail plan illustrating the steering mechanism applied to the rear carrying wheel.

A rear carrying wheel, $A^{10}$, is located below the bridge-piece, $A^6$, and is supported on an axle, $A^{11}$, extending transversely across the lower end of the fork, $A^{12}$, which has a neck, $A^{13}$, extending upward through the bearing $A^{14}$. Above said bearing said neck is supported by a nut, $A^{15}$, whereby said neck is secured in said bearing. On the left hand side of said fork is a laterally extended arm, $A^{16}$, to which is coupled the rear member, $A^{17}$, of a telescoping link, (Fig. 16). The forward member, $A^{18}$, of said link is tubular and interiorly screw-threaded around the exteriorly screw-threaded member, $A^{17}$. The forward end of the member $A^{18}$, is coupled to the rear end of a rotary shaft, $A^{20}$, said end of said shaft extending into said tubular member and a cross pin, $A^{19}$, extending through said tubular member and said shaft and forming a hinged joint. The shaft, $A^{20}$, rests in a bearing, $A^{21}$, in the cross member, $A^4$, and extends forward through said bearing and supports a worm wheel, $A^{22}$, which is engaged by a worm, $A^{23}$, which is on an upright shaft, $A^{24}$. The rotation of the shaft, $A^{24}$, will cause the rotation of the shaft, $A^{20}$, and the tubular member, $A^{18}$. The rotation of said member causes the latter to draw or drive the member, $A^{17}$, endwise, according to the direction of rotation of the member, $A^{18}$. Thus the link member is shortened or lengthened; and by this movement the arm, $A^{16}$, is moved forward or backward and the fork, $A^{12}$, is correspondingly turned on its upright axis—the axis of the neck, $A^{13}$. The turning of said fork changes the plane of the wheel, $A^{10}$, out of the longitudinal upright plane of the machine; and when said wheel is thus changed during forward or rearward movement of the machine, the rear end of the machine is shifted sidewise.

The shaft, $A^{24}$, extends upward through an upright bearing, $A^{25}$, formed on the front of the cross member, $A^4$.

Motion is transmitted to the shaft, $A^{24}$, by means which will next be described.

At each side of the frame, A, the chair casting, $A^1$, has a horizontal bearing, $A^{36}$. Said bearings are on an axial line which is horizontal and transverse to the length of the machine and the axial line of the shaft, $A^{24}$. In said bearings rests a rotary shaft, $A^{35}$. On the upper end of the shaft, $A^{24}$, is a bevel clutch wheel, $A^{26}$, which is adapted to engage either of two clutch wheels, $A^{27}$ and $A^{28}$, which are mounted on a sleeve, $A^{29}$, which is feathered on the shaft, $A^{35}$, to be rotated with the shaft and slidable endwise on the shaft. Said sleeve projects leftward of the clutch wheel, $A^{27}$, and said projecting portion is provided with a circumferential groove, $A^{30}$, in which is engaged the short arm, $A^{31}$, of a clutch lever, which is pivoted at $A^{32}$ to a stationary bracket, $A^{33}$, formed on the chair casting, $A^1$. The long arm, $A^{34}$, of said clutch lever extends to the right hand side of the machine and the right hand end of said arm is turned rearward and forked to extend to two sides of the hand lever, $O^{12}$. Said arm and said hand lever are coupled to each other by a bolt, $O^{13}$, extending horizontally through said arm and said lever. The lower end of said hand lever has a hub, $O^{14}$, which loosely surrounds a shaft, $O^{15}$, and which is horizontal and transverse to the length of the machine and rests in bearings, $O^{16}$ and $O^{17}$, formed in the chair, $A^1$, already described. Between the hub, $O^{14}$, and the bearing, $O^{17}$, the shaft, $O^{15}$, is surrounded by the hub $O^{19}$, of a short upright lever, $O^{20}$. Said lever is keyed rigidly to said shaft. By throwing said lever to its forward or backward limit, one or the other of clutch members, $A^{46}$, makes engagement with its companion clutch member; and placing the hand lever into its middle position leaves both the clutch members $A^{46}$, out of engagement with the companion clutch members (Figs. 9 and 10).

The left hand end of the shaft, $A^{35}$, projects far enough through the bearing, $A^{36}$, to receive a spur gear wheel, $A^{38}$, and a larger spur gear wheel, $A^{39}$, the latter meshing with a small spur gear wheel, $A^{40}$, on the shaft of a motor, M, which is seated on the frame, A, at the rear of and parallel to the shaft $A^{35}$. The shaft $A^{35}$, receives motion from the motor through the spur gear wheels, $A^4$ and $A^{39}$.

By means of the hand lever $O^{12}$, the clutch lever, $A^{31}$—$A^{34}$, may be oscillated to shift the clutch wheels, $A^{27}$ and $A^{28}$, to put one or the other of said wheels into engagement with the wheel, $A^{26}$, on the shaft $A^{24}$, or the hand lever may be put into its middle position to place both of the wheels, $A^{27}$ or $A^{28}$, out of engagement with the wheel, $A^{26}$. When that is done, the shaft, $A^{24}$ and the worm, $A^{23}$, will be at rest and the tubular link section, $A^{18}$, will not be rotated. Hence the fork, $A^{12}$, will be held stationary and position of the wheel, $A^{10}$, relative to the upright longitudinal plane of the machine will not change. When the clutch wheel $A^{27}$, engages the wheel, $A^{26}$, the wheel, $A^{10}$, and the fork, $A^{12}$, will be turned in one direction and when the clutch wheel, $A^{28}$, is put into engagement with the wheel, $A^{26}$, the fork will be turned in the opposite direction.

For the sake of safety, provision is made for automatically effecting the disenment of this clutch mechanism. Without such provision, the tubular link member might continue rotation until some part of the mechanism becomes deranged. Hence the mechanism next described.

Between the bridge-piece, $A^6$, and the nut, $A^{15}$, the neck, $A^{13}$, of the fork, $A^{12}$, is surrounded by an arm, $O^1$, which extends to the right of and is rigid on said neck. To the outer end of said arm is coupled the rear end of a link, $O^2$. The forward end of said link is coupled to a sleeve, $O^3$, which is mounted on a reciprocatory rod, $O^4$. Said sleeve is slitted longitudinally and provided with bolts, $O^5$, extending transversely through flanges on said sleeve. By tightening said bolts, said sleeve is clamped immovably to said shaft. When said bolts have been loosened, the sleeve may be moved to a new position on said shaft. The rear end of said rod rests slidably in an aperture, $O^6$, in the right hand standard, $B^3$, which is one of the supports for the conveyer as hereinafter described.

The forward end of the rod, $O^4$, extends horizontally through a bracket, $O^7$, seated on the clutch lever arm, $A^{34}$. Forward of said clutch lever a collar, $O^8$, surrounds said rod and is immovably secured thereto by a pin, $O^9$. Rearward of said clutch lever, said rod is surrounded by a shiftable collar, $O^{10}$. By means of a set-screw, $O^{11}$, said collar may be shifted on said rod to any desired point. When the clutch lever arm, $A^{34}$, is thrown forward by the operator, the clutch member, $A^{27}$, is placed into engagement with the clutch member, $A^{26}$, and the tubular member, $A^{18}$, is rotated and draws the link member, $A^{17}$, whereby the fork, $A^{12}$, is rotated so as to move the arm, $O^1$, rearward, whereby the link, $O^2$, and the rod, $O^4$, are drawn rearward. This action proceeds until the collar, $O^8$, bears against the bracket, $O^7$, and draws the latter and the clutch lever arm, $A^{34}$, rearward until the clutch is disengaged. When the clutch lever arm is moved rearward by the operator, the clutch member, $A^{28}$, is moved toward the left into engagement with the clutch member, $A^{26}$, whereby the tubular member, $A^{18}$, pushes the link, $A^{17}$, rearward. This movement causes the arm, $O^1$, and the link, $O^2$, and the rod, $O^4$, to move forward until the collar, $O^{10}$, bears against the bracket, $O^7$, and moves the clutch lever arm, $A^{34}$, whereby the clutch member, $A^{28}$, is disengaged from the clutch member, $A^{26}$. The principal function of the arm, $O^1$, link, $O^2$, rod, $O^4$, and the parts associated therewith is to limit the duration of the engagement of the clutch members, in order that the parts concerned with the control of the fork, $O^{12}$ may not be damaged by excessive rotation of the tubular link, $A^{18}$. A secondary function is performed by indicating to the operator the position of the wheel, $A^{10}$. When the collars, $O^8$ and $O^{10}$, are equidistant from the bracket, $O^7$, the wheel, $A^{10}$, is parallel to the length of the machine and in position for straight forward or backward travel.

The wheel, $A^{10}$, is idle. That is to say, no power is applied thereto. It serves merely as a carrying and steering wheel. For the propulsion of the machine, power is applied to the main carrying wheels, $A^9$, which, as above described, are journaled on the axle, $A^8$. These wheels, $A^9$, are driven from the shaft, $A^{35}$, from which, as above described, power is transmitted for steering the rear wheel, $A^{10}$.

Loosely surrounding the shaft, $A^{35}$, between collars, $A^{43}$, is a bevel cog wheel, $A^{41}$, to the inner face of which is applied one member, $A^{42}$, of a cone friction clutch. Between the bearing, $A^{37}$, and another collar, $A^{43}$, is a similar loose bevel cog wheel, $A^{44}$, directed toward the bevel cog wheel, $A^{41}$, and on the inner face of the wheel, $A^{44}$, is a cone friction clutch member, $A^{45}$, directed toward the similar cone friction clutch member, $A^{42}$.

Between the hubs of the wheels, $A^{41}$, and $A^{44}$, the shaft is surrounded by a pair of conical clutch members, $A^{46}$, adapted to fit into the clutch members, $A^{42}$ and $A^{45}$, and separated by a channel space, $A^{47}$. Said clutch members are unitary and are feathered on the shaft, $A^{35}$, to permit endwise movement and compel rotation with the shaft. The short arm of a clutch lever, $A^{48}$, extends into the channel, $A^{47}$. Said lever is pivoted at $A^{49}$. The long arm, $A^{50}$, of said lever is turned backward and forked to extend to opposite sides of the arm, $O^{20}$, and said members are coupled to each other by a horizontal bolt, $O^{21}$, extending transversely through said members. The shaft, $O^{15}$, projects rearward through the bearing, $O^{17}$, and is there surrounded by the hub, $O^{22}$, of a hand lever, $O^{23}$. Said hub is keyed rigidly to said shaft. Thus relative to the hand lever, $O^{23}$, and the arm, $O^{20}$, the shaft, $O^{15}$, serves as a rock shaft whereby motion may be transmitted from the upper end of the hand lever to the arm, $O^{20}$. The arm, $O^{20}$, is interposed in this manner in order to permit setting the hand lever, $O^{23}$, at a suitable distance from the hand lever, $O^{12}$.

Below the bevel cog wheels, $A^{41}$ and $A^{44}$, is a similar bevel cog wheel, $A^{52}$, fixed on an upright shaft, $A^{53}$, which rests in bearings, $A^{54}$ and $A^{56}$, the bearing, $A^{54}$, being in the main frame and the bearing, $A^{56}$, being in the casing, $A^{59}$. Between said bearings, said shaft has a worm, $A^{55}$, which meshes with a worm wheel, $A^{57}$, which is mounted on a transverse shaft, $A^{58}$, which is parallel to and forward of and below the shaft, $A^{35}$, and rests in bearings, $A^{60}$, formed on the lower face of the main frame (Figs. 4, 5, and 9). With the bearings, $A^{60}$, is associated a casing, $A^{59}$, which surrounds the worm wheel, $A^{57}$. Each end of the shaft, $A^{58}$, projects through the adjacent bearings, $A^{60}$, and is surrounded by a sprocket wheel, $A^{61}$, which is rigid on said shaft and supports an endless sprocket chain, $A^{62}$, which surrounds the sprocket wheel, $A^{63}$, which is rigid on the inner side of the adjacent carrying wheel, $A^9$, and concentric with the axle, $A^8$.

By means of the clutch lever, $A^{48}$—$A^{50}$, the conical clutch members, $A^{43}$, may be put into the middle position so that no engagement is made with either of the clutch members, $A^{42}$ or $A^{45}$, or the members, $A^{46}$, may be shifted so as to engage one or the other of the members, $A^{42}$ and $A^{45}$. Engagement with one of said members will cause the rotation of the cog wheel, $A^{52}$, in one direction, while engagement with the other of said members will cause rotation of the wheel, $A^{52}$, in the opposite direction. Rotation of the wheel, $A^{52}$, will cause the rotation of the train of transmission members leading to the sprocket chain, $A^{62}$, whereby said chain is driven to rotate the carrying wheel, $A^9$, in one direction or the other.

Within the worm wheel, $A^{57}$, the shaft, $A^{58}$, is divided and ordinary differential gearing is formed within the worm wheel and applied to the two sections of the shaft, in order to permit independent rotation of the sprocket wheels, $A^{61}$, while the machine is traversing a curved path.

Brakes are applied to the carrying wheels as follows:

On the axle, $A^8$, and within each sprocket wheel, $A^{63}$, is a rigid bracket, $U^1$, extending rearward. A strap-form expansion member, $U^2$, is located within the sprocket wheel and has its middle portion opposite the rear end of the bracket, $U^1$. A pair of ears, $U^3$, resting on the expansion member extend to opposite sides of the bracket, $U^1$, and a pin, $U^4$, secures said ears to said bracket. By this means, said expansion member is supported.

A shorter bracket, $U^5$, extends forward and downward from the axle, $A^8$. In said bracket is formed a horizontal bearing, $U^6$, in which rests a rock-shaft, $U^7$, extending from the bracket $U^5$, of one of said sprocket wheels, $A^{63}$, to and through the bracket, $U^5$, of the companion sprocket wheel, $A^{63}$, at the other side of the machine. Between each bracket, $U^5$, and the adjacent sprocket wheel, said rock-shaft rigidly supports a short arm, $U^8$, which extends upward and has coupled to its upper end the rear end of a short link, $U^9$. To the forward end of said link are coupled the meeting ends of a pair of toggle links, $U^{10}$, which have their opposite ends coupled to the ends of the expansion member, $U^2$.

Figure 19:
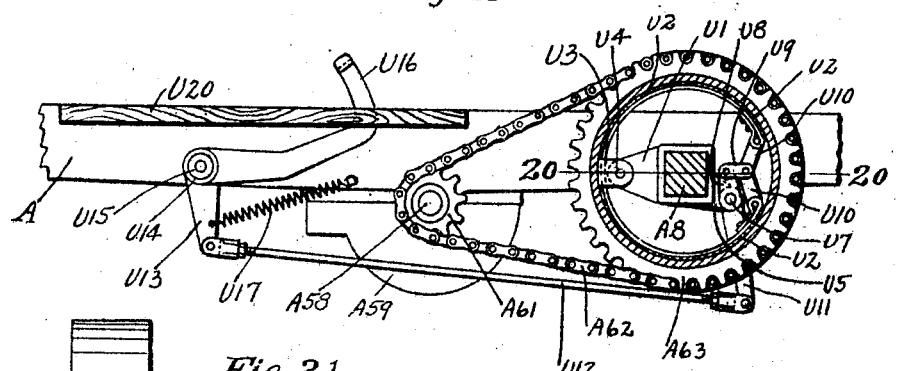
Fig. 19 is an upright section on the line, 19—19, of Fig. 7, looking in the direction of the arrow.
Figure 21:
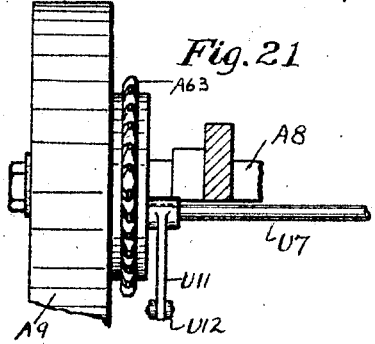
Fig. 21 is an elevation of the mechanism shown by Fig. 19, looking toward the left.

Turning the rock-shaft clockwise, as viewed in Fig. 19, will drive the toggle members forward and force the expansion member outward for engagement with the interior of the sprocket wheel, $A^{63}$, in the usual manner.

Near the right hand sprocket wheel, $A^{63}$, an arm, $U^{11}$, is secured rigidly to the rock shaft, $U^7$. To the lower end of said arm is coupled the forward end of a connecting rod, $U^{12}$. The rear end of said connecting rod is coupled to the lower end of an arm, $U^{13}$, extending downward from a sleeve, $U^{14}$, which loosely surrounds a stud, $U^{15}$, which is horizontal and transverse to the length of the machine and rigid on the right hand face of the main frame, $A^1$. A pedal, $U^{16}$, is rigid on the sleeve, $U^{14}$, and extends forward to a position near the hand levers, $O^{23}$ and $O^{12}$. By depressing the pedal, the connecting rod, $U^{12}$, is drawn rearward and the rock shaft is turned in the proper direction to force the toggle members of the brake forward. A spring, $O^{17}$, is applied to normally lift the pedal.

Rearward of the hand levers, $O^{12}$ and $O^{23}$, and the pedal, $U^{16}$, is a seat, $U^{18}$, for the operator of the machine. Said seat is supported on a standard, $U^{19}$, which rests on a platform, $U^{20}$, which rests on brackets, $U^{21}$, projecting rightward from the right hand portion of the main frame or base, A.

From the foregoing it will be understood how the machine is given bodily forward and backward and diagonal movement upon the earth or floor to approach and recede from the material to be loaded.

In the particular form of the apparatus shown by the drawings, the mechanism concerned directly with the handling of the material to be loaded comprises three groups: (1) the conveyer mechanism, B, (2) the shovel mechanism, C, and (3) the magazine or hopper mechanism, D. The conveyer mechanism comprises a stationary, inclined frame-work and an endless, traveling apron. The shovel mechanism is located in front of the conveyer mechanism and comprises a shovel which takes material from the ground or floor and carries it backward and discharges it upon the conveyer mechanism. The magazine or hopper is supported upon the rear of the conveyer mechanism structure in position to receive the material discharged from the rear end of the conveyer. The magazine has gate mechanism through which the material accumulated in the magazine may be quickly discharged into a wagon or other vehicle temporarily placed below the magazine.

The conveyer mechanism, the shovel mechanism, and the magazine mechanism will now be described in the order in which they have been named.

In its general features, the conveying mechanism is similar to conveying mechanisms heretofore used for similar purposes, as, for example, in the loading machines described by Letters Patent of the United States No. 940,998 and No. 940,999, granted to me November 23, 1909.

The conveyer body, $B^1$, has its forward end immovably secured to the frame or base, A, by means of upright plates, $B^2$, (see Figs. 22 and 23), the plates, $B^2$, being bolted or riveted to the conveyer body and the plates, $C^2$, which are supported on the main frame (Figs. 4, 5, 22 and 23). At each rear corner of the frame or base, A, rises a column or standard, $B^3$, to the upper end of which is rigidly secured the conveyer body, the latter projecting rearward of said standards. A gusset plate, $B^4$, is applied to each outer face of the frame, A, and to the lower portion of the corresponding column or standard, $B^3$, by rivets or bolts. A gusset plate, $B^5$, is similarly applied to the rear face of each standard and the adjacent outer end of the bridge-piece, $A^6$. Diagonal braces, $B^6$, cross each other between the standards, $B^3$, and have their lower ends secured to the gusset plates, $B^5$, while their upper ends are secured to the gusset plates, $B^8$, which are also secured to the rear faces of the adjacent standards, $B^3$. Gusset plates, $B^7$, extend across the upper ends of the standards, $B^3$, and the adjacent outer face of the conveyer body and are secured to said body and said standard. Immediately at the rear of the base of each standard, $B^3$, a brace, $B^9$, extends diagonally upward and rearward, the lower end of said brace being secured to the gusset plate, $B^4$, while the upper end is secured to the gusset plate, $B^{10}$, which is attached to the upper part of the adjacent face of the conveyer body, $B^1$. By the means described, the conveyer body is immovably supported upon the frame or base, A, of the machine.

At the lower end of the conveyer body is a transverse apron shaft, $B^{11}$, resting in bearing blocks, $B^{12}$. Each such bearing is adjustable in a channel, $B^{13}$, in the plate, $B^2$, by means of the bolt, $B^{14}$, extending through a bridge-piece, $B^{15}$, on the forward edge of said plate. Between its bearings, the apron shaft, $B^{11}$, is surrounded by fixed sprocket wheels, $B^{16}$, one such wheel being near each bearing.

At the upper end of the conveyer body, an apron shaft, $B^{17}$, extends horizontally and transversely across said body and rests in bearings, $B^{18}$, which are slidable in channels, $B^{19}$, formed in the plates, $B^{10}$. Said bearings are adjustable by means of bolts, $B^{20}$, extending through bridge-pieces, $B^{21}$. The apron shaft, $B^{17}$, is surrounded by sprocket wheels, $B^{22}$, fixed upon said shaft. The endless apron, $B^{23}$, lies lengthwise upon the body, $B^1$, and extends over the sprocket wheels, $B^{16}$ and $B^{22}$, and beneath the body, $B^1$. At the left hand side of the machine, the shaft, $B^{17}$, supports a sprocket wheel, $B^{24}$, which is keyed to said shaft. An endless sprocket chain, $B^{25}$, surrounds said wheel and a sprocket wheel, $B^{26}$, which is mounted on the left hand end of the shaft, $B^{27}$, which is horizontal and transverse to the length of the machine and rests in bearings, $B^{28}$, which are supported on the upper face of the frame or base, A.

Immediately at the right of the right hand bearing, $B^{28}$, a sprocket wheel, $B^{29}$, surrounds the shaft, $B^{27}$, immovably. A sprocket chain, $E^1$, is applied to the sprocket wheel, $B^{29}$, and to a sprocket wheel, $E^2$, immovably surrounding the right hand end of a shaft, $E^3$, resting in bearings, $E^4$, and $E^5$, in the chair casting, $A^1$.

Said shaft receives motion from the shaft, $A^{35}$, through a clutch and a pair of spur gear wheels, as will next be described.

A sleeve, $E^6$, surrounds the shaft, $E^3$, within the bearing, $E^5$, and projects through said bearing in each direction. At the left of said bearing, said sleeve is surrounded by a spur gear wheel, $E^7$, which is keyed to said sleeve. Said spur gear wheel meshes with a spur gear wheel, $E^8$, which surrounds and is keyed to the shaft, $A^{35}$. Through the gears, $E^8$ and $E^7$, rotation is imparted to the sleeve, $E^6$. At the right of the bearing, $E^5$, the cup member, $E^9$, of a conical friction clutch surrounds the sleeve, $E^6$, and is fixed thereon. The cone member, $E^{10}$, of said clutch surrounds the shaft, $E^3$, and is feathered thereon to permit longitudinal sliding and to compel rotation with the shaft, $E^3$.

An expanding coiled spring, $E^{11}$, surrounds said shaft at the right of the clutch member, $E^{10}$, and bears against said member and also against a collar, $E^{12}$, surrounding the shaft at the right of the sleeve. Said spring is of proper tension to normally make engagement between the two clutch members for the transmission of power from the sleeve, $E^6$, to the shaft, $E^3$. The collar, $E^{12}$, is screw threaded on the shaft in order to permit adjustment toward and from the clutch.

The hub of the clutch member, $E^{10}$, has a circumferential channel, $E^{13}$, in which rests a clutch collar, $E^{14}$, having radial studs, $E^{15}$, which rest in bearings, $E^{16}$, in an upright yoke, $E^{17}$. The lower end of said yoke is forked and is coupled to the left hand end of a fulcrum bolt, $E^{18}$, the right hand end of which is immovably secured to one of a pair of bars, $E^{19}$, which are horizontal and parallel to the length of the machine and supported at opposite sides of and bolted to a block, $E^{20}$, resting on and bolted to the bridge-member, $A^3$, of the main frame and at opposite sides of and bolted to a block, $E^{21}$, resting on and bolted to the chair casting, $A^1$.

The upper end of the yoke, $E^{17}$, is also forked, and to said end is coupled the left hand end of a connecting rod, $E^{22}$, by which the upper portion of said yoke is pulled rightward when it is desired to suspend transmission from the wheel, $E^7$, to the shaft, $E^3$. On the right hand end of said connecting rod is an eye, $E^{23}$, the axis of which is horizontal and parallel to the length of the machine. Within said eye is an eccentric, $E^{24}$, having journals, $E^{25}$, supported in a pair of bracket plates, $E^{26}$, which are applied to the right hand side of the conveyer body, $B^1$, and project below said body. On one of the journals of said eccentric is a crank or hand lever, $E^{27}$. Said eccentric is normally set to place the connecting rod far enough to the left to allow the spring, $E^{11}$, to press the clutch member, $E^{10}$, into engagement with the clutch member, $E^9$. By turning the hand lever, $E^{27}$, the eccentric is made to draw the connecting rod toward the right, whereby, through the yoke, $E^{17}$, the clutch member, $E^{10}$, is forced to the right and out of engagement in opposition to the spring, $E^{11}$, whereupon transmission from the spur gear wheel, $E^7$, to the shaft, $E^3$, is suspended. During the operation of the machine, the conveyer belt is to be operated continuously. When the operation of the conveyer mechanism is to be suspended, the clutch is disengaged as already described. The shovel mechanism, described farther on, also receives motion from the shaft, $B^{27}$, through the sprocket wheels, $C^1$, immovably surrounding the ends of said shaft.

The magazine mechanism, D, will next be described.

Each upper gusset plate, $B^{10}$, extends below the conveyer body, $B^1$, and a little way forward of each such plate is another plate, $D^1$, secured to the adjacent face of said body and also extended below said body. At each side of the conveyer, the magazine has an upright side plate, $D^2$, the upper edge of which bears against the adjacent lower face of the conveyer body and outward against the inner face of the downward extended portions of the adjacent gusset plates, $B^{10}$ and $D^1$; and said plate, $D^2$, is secured to said plates, $B^{10}$ and $D^1$, by means of bolts or rivets. Said side plates, $D^2$, are joined to each other by a forward transverse plate, $D^3$. At a short distance rearward of said plate, $D^3$, is a bottom plate, $D^4$, and from the rear edge of the bottom plate, $D^4$, a rear end plate, $D^5$, extends from one side plate, $D^2$, to the other.

Between the plate, $D^3$, and the plate, $D^4$, is a discharge opening which is normally covered by a door, $D^6$. From each end of the door, a hanger, $D^7$, extends upward along the outer face of the adjacent side plate, $D^2$. The upper end of said hanger extends between a bracket, $D^8$, and the plate, $D^2$. A pintle, $D^9$, extends through said bracket and hanger, whereby said door is hinged. The door is concaved to conform to the convexity of the outer face of the forward plate, $D^3$, in order that the door may be swung forward and upward until the opening normally covered by the door is clear from the downward passage of the material in the magazine. At each side of the magazine, a bar, $D^{10}$, is secured in horizontal position to the outer face of the door hanger, $D^7$. Said bar is extended rearward to the rear part of the magazine and thence turned laterally to the middle upright longitudinal plane of the machine, and thence horizontally rearward, the two bars meeting and being secured to each other by riveting or otherwise. These portions of said bar constitute a handle, $D^{11}$. For moving the door rearward, said handle is pulled downward. When that is done, the handle and the handle bars and the door swing on the pintle, $D^9$.

The door is normally locked in the closed position by latch mechanism. Immediately at the rear of the magazine, a horizontal bridge-piece, $D^{12}$, connects the two bars, $D^{10}$. On the handle, $D^{11}$, is a bell-crank, $D^{13}$, fulcrumed at $D^{14}$ on said handle. One arm of said bell-crank extends rearward above the handle, $D^{11}$, while the other arm of said bell-crank rises and is coupled to the rear end of a connecting rod, $D^{15}$. The forward end of said connecting rod is coupled to the upper end of a hook, $D^{16}$, which is pivoted at $D^{17}$, to a standard, $D^{18}$, which is supported on the bridge-piece, $D^{12}$. The hook, $D^{16}$, is directed forward and normally engages a bracket, $D^{19}$, fixed on the rear face of the end plate, $D^5$, of the magazine. When the door is to be opened, the operator draws the horizontal arm of the bell-crank downward whereby the hook, $D^{16}$, is drawn rearward out of engagement with the bracket, $D^{19}$. By continuing to pull downward on said bell-crank arm, engagement is made between said arm and the handle, $D^{11}$, and said two members are drawn down together.

By using the magazine, the operation of the conveyer may be carried on continuously, and a receiving vehicle need be placed beneath the magazine only as often as the latter becomes filled with material. This reduces the time during which such a vehicle must be in position below the rear end of the conveyer. Furthermore, the forward and rearward and lateral movements of the rear end of the machine make it difficult to keep the receiving vehicle in position below the rear end of the conveyer.

It now remains to describe the shovel mechanism. Said mechanism is supported partially by the yoke, $C^9$—$C^{10}$—$C^{11}$, which is fulcrumed to the forward end of the main frame.

At the forward end of the main frame, A, a plate, $C^2$, is bolted flatwise against each outer side face of said frame and made to project above and forward of said frame. The portion of said plate which projects forward of said frame has a horizontal slot, $C^3$, in which rests a slidable bearing, $C^4$, which has an upper and a lower channel, $C^5$, in which rests the portion of the plate above and below the slot, $C^3$. Across the forward end of said slot extends a bridge-piece, $C^6$, through which extends a bolt $C^7$, which is supported immovably on the front face of the bearing block, $C^4$, and extends horizontally and slidably forward through said bridge-piece. Forward of said bridge-piece a nut surrounds said bolt. By turning said nut forward, said bolt and said bearing block are forced toward the front of the machine. A hinge shaft, $C^8$, extends through said bearing blocks and through the rear portions of the parallel arms, $C^9$, of a yoke, $C^9$—$C^{10}$—$C^{11}$, whereby said yoke is hinged adjustably to the main frame. From said shaft, said yoke is extended downward below the main frame and is then shaped to constitute a V-shape member, $C^{10}$, extending rearward and having its apex in the middle, upright, longitudinal plane of the main frame. From said apex an arm, $C^{11}$, extends rearward beneath the bridge member, $A^3$, of the frame and beneath the pair of bars, $E^{19}$, which as already described, are secured to the block, $E^{20}$, which is mounted on said bridge-piece and to the block, $E^{21}$, which is mounted on the chair casting, $A^1$. The shovel mechanism is supported by the arms, $C^9$, of said yoke, and the weight of said mechanism is sufficient to constantly tend to tilt the yoke on the fulcrum formed by the shaft, $C^8$, said arms going downward and the V-shape member, $C^{10}$, going upward. Such upward movement of said member is limited by engagement of the arm, $C^{11}$, with a stop mechanism which will now be described.

In the arm, $C^{11}$, is an upright aperture, $C^{12}$. Above said aperture is a stop block, $C^{13}$ which is of sufficient area to bear against the upper face of the member, $C^{11}$. Said block has an upright aperture, $C^{14}$, which registers with the aperture, $C^{12}$. An upright screw shaft, $C^{15}$, extends through the apertures, $C^{14}$, and $C^{12}$. A cross pin, $C^{16}$, extends transversely through said block and said shaft and joins said members to each other. The apertures, $C^{14}$ and $C^{12}$, are larger than the cross section of the screw shaft, whereby rocking of the screw shaft in said apertures is permitted. The upper portion of said shaft extends through a gear nut, $C^{17}$, which rests in an upright bearing, $C^{18}$, formed in a block, $C^{19}$, which is located between the two bars, $E^{19}$, already described. Trunnions, $C^{20}$, extend horizontally from said block into bearings, $C^{21}$, formed in said bars. Thus said block is adapted to rock on an axis which is horizontal and transverse to the length of the machine, said axis being the axis of the trunnions, $C^{20}$. The gear nut extends below the block, $C^{19}$, and that portion of said nut is exteriorly screw threaded and surrounded by a nut, $C^{22}$, which bears against the lower face of the block, $C^{19}$, and prevents upward movement of the gear nut. Above said block, the gear nut is expanded and shaped to provide a bevel gear wheel having its teeth, $C^{23}$, directed upward and meshing with a bevel gear wheel, $C^{24}$, which is rigid on the left hand end of the shaft, $C^{25}$, which is horizontal and transverse to the length of the machine and rests in a bearing, $C^{26}$, which rises from the main frame of the machine. Between said bearings, said shaft has a knuckle joint, $C^{28}$, which permits flexibility necessary during the rocking of the block, $C^{19}$. On the right hand end of said shaft is a sprocket wheel, $C^{29}$, to which is applied a sprocket chain, $C^{30}$, which extends upward and surrounds a sprocket wheel, $C^{31}$, which is rigid on a hub, $C^{32}$, of a hand wheel, $C^{33}$, which is rotatable on a spindle, $C^{34}$, which is supported rigidly and horizontally on the right hand outer face of the conveyer body, $B^1$. By turning said hand wheel clockwise, the train of mechanism is operated to turn the gear nut clockwise and thereby lift the screw shaft and the stop block, $C^{13}$. Moving the stop block into a higher position allows the member, $C^{11}$, to rise correspondingly and to permit the arms, $C^9$, to assume a lower position. Turning the hand wheel in the opposite direction causes the setting of the stop block, $C^{13}$, in a lower position, which involves pressing the member, $C^{11}$, downward. At a short distance below the member, $C^{11}$, a nut, $C^{35}$, is threaded to the screw shaft, $C^{15}$. Said nut serves as a stop to limit downward movement of the member, $C^{11}$, when by any means the shovel mechanism is forced upward with consequent downward movement of the member, $C^{11}$. That may occur when the shovel hereinafter described makes forward movement on the upper face of an oblique resisting surface such as a rock or lump of coal or other similar material. Oscillations of the screw shaft and the blocks, $C^{19}$, occur during the up and down movements of the member, $C^{11}$.

On the right hand or forward end of each parallel yoke arm, $C^9$, is a horizontal transverse bearing, $C^{36}$. In said bearings rests a crank shaft, $C^{37}$, to which is applied one end of the shovel, as will be hereinafter described. Each end of the crank shaft projects through the adjacent bearing, $C^{36}$, and bears a sprocket wheel, $C^{38}$, keyed to said shaft. Between said bearings, $C^{36}$, and the shaft, $C^8$, an upright cam plate, $C^{39}$, is secured to each arm, $C^9$. The lower edge of each of said cam plates overlaps the outer face of the adjacent arm, $C^9$, and is secured to the latter by bolts or rivets, $C^{40}$. Along the inner face of each of said cam plates is a cam groove, $C^{41}$, in which slidably rest the ends of a horizontal transverse bar, $C^{42}$. The ends of said bar are shown surrounded by an anti-friction roller, $C^{43}$. Said bar, $C^{42}$, supports the rear end of the shovel, as will be hereinafter described. Said cam plate, $C^{39}$, extends obliquely upward and rearward from the crank shaft, $C^{37}$. Above about the middle of the length of the groove, $C^{41}$, a groove, $C^{44}$, begins on the inner face of said plate, and extends thence rearward—away from the crank shaft, $C^{37}$, and forms a downward curve a little way beyond and then lower than the rear end of the groove, $C^{41}$. The forward portion of said groove, $C^{44}$, is wide or flaring, and the remainder is approximately the width of the groove, $C^{41}$, and forms a curve nearly equaling a quarter of a circle. One point to be observed regarding these grooves is that the rear end of the groove, $C^{44}$, is rearward of and below the rear end of the groove, $C^{41}$. The function of said groove, $C^{44}$, is to receive and change the course of a crank, $C^{45}$, on the bar, $C^{42}$, which supports the rear shovel section, $C^{47}$, as will be next described.

A little rearward of the nose of the shovel are bearings, $C^{48}$, in which rests the crank shaft, $C^{37}$. The shovel is composed of a forward section, $C^{46}$, and a rear section, $C^{47}$. The forward section has at each side a rearward extension, $C^{49}$, terminating in a bearing, $C^{50}$, loosely surrounding the bar, $C^{42}$, so that said forward section, $C^{46}$, is journaled to said crank shaft, $C^{37}$, by means of the bearings, $C^{48}$, and also to said bar, $C^{42}$, and must adapt itself to the movements of the crank of said crank shaft and of said bar as will be hereinafter described. The rear section, $C^{47}$, of said shovel rests between the rearward extensions, $C^{49}$, of the forward section and is immovably secured to said bar, $C^{42}$, and the forward portion of said rear section rests loosely within the rear portion of said forward section, $C^{46}$, so that, by the rotation of the bar, $C^{42}$, contra-clockwise, as viewed in Fig. 1, said section, $C^{47}$, may turn or tilt with said bar (on an axis which is horizontal and transverse to the length of the machine), the forward end of said rear section being lifted out of the forward section, $C^{46}$.

The movement of the forward portion or nose of the shovel section, $C^{46}$, is controlled by the crank-shaft, $C^{37}$. Said crank-shaft is rotated contra-clockwise as viewed in Fig. 1. The movement of the rear end of said forward shovel section is controlled by the cam grooves, $C^{41}$, the transverse bar, $C^{42}$, as above described, sliding in said grooves. Hence it will be observed that the nose of said forward shovel section will travel in a relatively large orbit while its rear end merely reciprocates in a path which is nearly straight and approximately horizontal. In other words, said forward shovel section is moved nearly like an ordinary pitman attached to an ordinary crank, the movement in the present case being modified by the irregularity of the cam grooves. And said forward section turns or tilts (not so far as the rear section) on the bar, $C^{42}$, or on an axis which is horizontal and transverse to the length of the machine.

Figure 1:
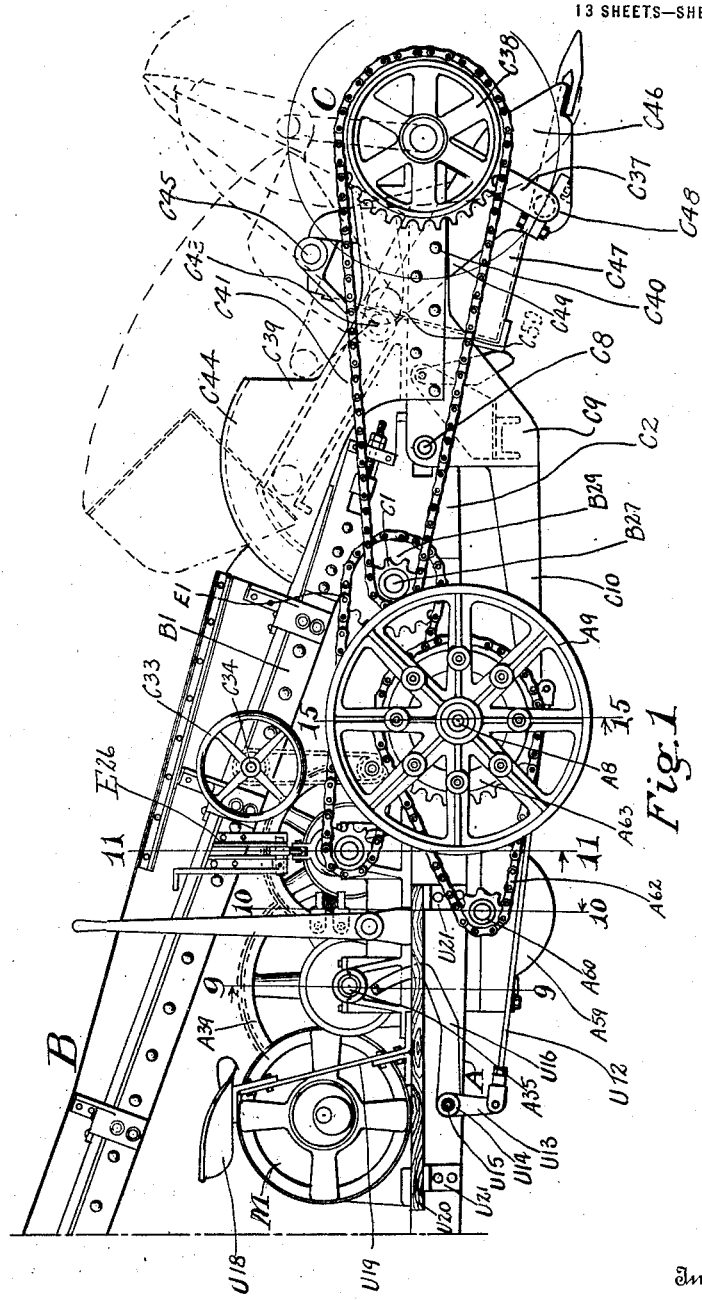
Figure 1 is a right hand side elevation of the forward half of a machine embodying my invention.

When during its descent, the nose of the shovel reaches the floor, it is desirable that said nose move forward horizontally or in a plane parallel to the floor until the forward section of the shovel is filled with the material to be loaded. This parallel or horizontal movement of said nose is attained by lowering the rear end of the shovel during the interval of forward movement needed for the filling of said forward section. Such lowering of the rear end of the shovel is attained by lowering or inclining the portion of the cam groove, $C^{41}$, which is forward of the bar, $C^{42}$, when the nose of the shovel reaches the floor, and continuing such inclination as far as said bar has to travel before said forward section of the shovel begins to lift its load. The load thus taken by the forward section of the shovel is to be transferred from said section into the rear shovel section, and then transferred by the latter to the forward endless apron, $B^{23}$, of the conveyer mechanism, B. For making such transfer of said load from the forward shovel section to the rear shovel section, the shovel is tilted, the nose rising higher and higher while the rear portion remains at approximately the same level. The nose of the shovel is to be thus raised sufficiently to cause its load to slide rearward and downward into the rear shovel section. Said position is attained when the crank shaft, $C^{37}$, is in the position shown by dotted lines, in Fig. 1, the bar, $B^1$, then resting in the lowest portion of the cam grooves, $C^{41}$. The load being now in the rear shovel section, the further movement of the crank shaft moves the entire shovel rearward until the cranks, $C^{45}$, enter the grooves, $C^{44}$. Said cranks are keyed on the bar or shaft, $C^{42}$, at each side of the shovel between the extensions, $C^{49}$, of the forward shovel section and the cam plate, $C^{39}$, and extend forward and upward at an angle of approximately forty-five degrees when the shovel is in its lowest position, as shown in Fig. 1. By the time the crank shaft, $C^{37}$, has raised the forward portion of the shovel as high as it will go, said cranks are directed rearward and upward, as shown by the dotted lines in the expanded portion of the groove, $C^{44}$, of the cam plate, $C^{39}$, in Fig. 1, the wrist, $C^{51}$, on each of said cranks, $C^{45}$, entering the wide portion of the groove, $C^{44}$. Upon the further rearward movement of the bar, $C^{42}$, by the further rotation of the crank, $C^{37}$, said wrists of said crank, $B^3$, are forced rearward and downward in said groove, $C^{44}$, whereby the rear shovel section revolves partially around the bar, $C^{42}$, contra-clockwise as viewed in Fig. 1, until it becomes inverted to such extent as to discharge its load by gravity. But the rapidity of such movement of the rear shovel section may be varied by varying the positions and curves of the grooves, $C^{41}$ and $C^{44}$, and by varying the length of the cranks, $C^{45}$. If so desired, such movement may be made sufficiently rapid to cause the throwing of said load forcibly rearward instead of permitting it to slide off said shovel section by gravity. When the crank-shaft, $C^{37}$, has turned rearward to its limit, said forward shovel section and said bar, $C^{42}$, cease rearward movement and begin a forward movement, whereby the cranks, $C^{45}$, reverse their movement and cause a reverse turning movement of the bar, $C^{42}$; and such reverse movement of said bar causes the rear shovel section to revolve in the forward direction until said cranks are disengaged from the grooves, $C^{44}$. This occurs when the forward shovel section is already well down toward the floor and the rear shovel section has to turn approximately sixty degrees to attain its normal position of rest in the forward section. Through such arc, said rear section falls by gravity.

The crank shaft, $C^{37}$, is driven by two sprocket chains, $C^{52}$, one surrounding each sprocket wheel, $C^{38}$, and a sprocket wheel, $C^1$, on the horizontal transverse shaft, $B^{27}$; and power is transmitted to said shaft by means of the sprocket chain, $E^1$, which receives power from the sprocket wheel, $E^2$, on the transmission shaft, $E^3$.

The short wheel base and the long reach of the shovel mechanism forward of the wheels make it possible for the machine to shovel from a relatively wide strip while the movement of the wheels—forward and backward, straight and obliquely—is confined to a relatively narrow strip located at the middle of the wide strip, said narrow strip bearing some resemblance to the rail track on which the machine of my abovementioned patents travels. In that machine the lateral reach is attained by the lateral swinging of the jib which supports the shovel mechanism. In the present machine, the lateral reach is attained by using the wheels as a pivotal base for the bodily turning of the entire machine.

The machine may also be operated by placing the machine at one end (for example, the left hand end) of the "face" of a pile of material and setting the supporting wheels so as to direct the machine obliquely toward the other end of said face, the swivel wheel being set to cause the machine to traverse a curve reaching to the other end of said face. When thus set, the machine may be moved forward and backward (on said curve) with the shovel mechanism in operation until the other end of said face has been reached, the material being thus cleared away until the face has been brought to a curve corresponding to the curved path which the machine will traverse while the oblique position of the swivel wheel remains unchanged.

When the right hand end of the path has been reached, the machine may be driven backward until the left hand end of the face has again been reached. Then, on changing the position of the swivel wheels, the machine is moved bodily forward toward that end of the face until it is in position to traverse a curved path which is at a chosen distance forward of and parallel to the path previously traversed. In this manner the machine may be made to repeatedly traverse said face without changing the direction of the swivel wheel excepting when the machine has returned to the left hand end of the face.

This last method of operation is suited to long faces. The other method is suitable when there is no long face and the direction of operation is necessarily forward.

The two drive wheels are placed at the front in order to provide a transverse wheel base to give the forward portion of the machine stability while strains are exerted through the shovel mechanism, particularly during the upward movement of the shovel against the resistance of superposed material.

I claim as my invention,

1. In a loading machine, the combination of supporting wheels, a motor, means controlled by the operator for placing said motor into operative relation with a portion of said wheels for driving the latter, power-driven means controlled by the operator for varying the direction of a portion of said wheels for steering the machine, a conveyer extending from the forward part of the machine upward and rearward beyond the rear end of the body of the machine, an elevated magazine supported by the upper end of the conveyer in position to receive material from the conveyer, a yoke hinged to and supported by the body of the machine, and projecting forward of said body and rearward of the hinge and under said body, an upright, non-rotatable screw shaft coupled to the rear part of the yoke, nut mechanism surrounding said shaft above the yoke and seated on a relatively stationary part of the machine, manual means located on the body of the machine and comprising gearing for actuating said nut mechanism for raising and lowering said screw shaft, and means at the front of said yoke for taking material from the floor and discharging it upon the conveyer, substantially as described.

2. In a loading machine, the combination of supporting wheels, a motor, means controlled by the operator for placing said motor into operative relation with a portion of said wheels for driving the latter, power-driven means controlled by the operator for varying the direction of a portion of said wheels for steering the machine, a conveyer extending from the forward part of the machine upward and rearward beyond the rear end of the body of the machine, an elevated magazine supported by the upper end of the conveyer in position to receive material from the conveyer, a yoke hinged to and supported by the body of the machine and projecting forward of said body and rearward of the hinge, an upright, non-rotatable screw shaft coupled to the rear part of the yoke, a nut surrounding said shaft, a bearing seated on a relatively stationary part of the machine and supporting said nut, manual means comprising gearing for turning said nut, means located at the forward part of said yoke, to take material from the floor and discharge it upon the conveyer, substantially as described.

3. In a loading machine, the combination of supporting wheels, a motor, means controlled by the operator for placing said motor into operative relation with a portion of said wheels for driving the latter, power-driven means controlled by the operator for varying the direction of a portion of said wheels for steering the machine, a conveyer extending from the forward part of the machine upward and rearward beyond the rear end of the body of the machine, an elevated magazine supported by the upper end of the conveyer in position to receive material from the conveyer, a yoke hinged to and supported by the body of the machine and projecting forward of said body and rearward of the hinge and below said body, an upright, non-rotatable screw shaft slidably engaged by the rear part of the yoke, nut mechanism surrounding said shaft above the yoke and seated on a relatively stationary part of the machine, manual means comprising gearing for actuating said nut mechanism, means located at the forward part of said yoke to take material from the floor and discharge it upon the conveyer, substantially as described.

4. In a loading machine, the combination of supporting wheels, a motor, means controlled by the operator for placing said motor into operative relation with a portion of said wheels for driving the latter, power-driven means controlled by the operator for varying the direction of a portion of said wheels for steering the machine, a conveyer extending from the forward part of the machine upward and rearward beyond the rear end of the body of the machine, an elevated magazine supported by the upper end of the conveyer in position to receive material from the conveyer a yoke hinged to and supported by the body of the machine and projecting forward of said body and rearward of the hinge and beneath said body, an upright, non-rotatable screw shaft coupled to the rear part of the yoke, a nut surrounding said shaft, a rocking bearing block seated on a relatively stationary part of the machine and supporting said nut, manual means comprising gearing for turning said nut, means located at the forward part of said yoke to take material from the floor and discharge it upon the conveyer, substantially as described.

5. In a loading machine, the combination of supporting wheels, a motor, means controlled by the operator for placing said motor into operative relation with a portion of said wheels for driving the latter, power-driven means controlled by the operator for varying the direction of a portion of said wheels for steering the machine, a conveyer extending from the forward part of the machine upward and rearward beyond the rear end of the body of the machine, an elevated magazine supported by the upper end of the conveyer in position to receive material from the conveyer a yoke hinged to and supported by the body of the machine and projecting forward of said body and rearward of the hinge beneath the body of the machine, an upright, non-rotatable screw shaft coupled to the rear part of the yoke, a nut surrounding said shaft above the yoke, a rocking bearing block seated on a relatively stationary part of the machine and supporting said nut, a jointed shaft in operative relation with said nut for turning it; manual means for turning said shaft, means located at the forward part of said yoke to take material from the floor and discharge it upon the conveyer, substantially as described.

6. In a loading machine, the combination of supporting wheels, a motor, means controlled by the operator for placing said motor into operative relation with a portion of said wheels for driving the latter, power-driven means controlled by the operator for varying the direction of a portion of said wheels for steering the machine, a conveyer extending from the forward part of the machine upward and rearward beyond the rear end of the body of the machine, an elevated magazine supported by the upper end of the conveyer in position to receive material from the conveyer a yoke hinged to and supported by the body of the machine and projecting forward of said body and rearward of the hinge and beneath said body, an upright, non-rotatable screw shaft coupled to the rear part of the yoke, a nut surrounding said shaft above the yoke, a rocking bearing block seated on a relatively stationary part of the machine and supporting said nut and supporting a horizontal bearing, a horizontal bearing on a stationary part of the machine, a jointed shaft resting in said two bearings and being in operative relation with said nut for turning the latter, manual means for turning said shaft, means located at the forward part of the yoke to take material from the floor and discharge it upon the conveyer, substantially as described.

In testimony whereof I have signed my name, this 22nd day of November, in the year one thousand nine hundred and seventeen.

WILLIAM WHALEY.